United States Patent
Midoumae et al.

(10) Patent No.: US 9,822,816 B2
(45) Date of Patent: Nov. 21, 2017

(54) FOIL BEARING

(71) Applicant: NTN CORPORATION, Osaka (JP)

(72) Inventors: Jun Midoumae, Mie (JP); Masato Yoshino, Mie (JP); Hiroki Fujiwara, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/126,635

(22) PCT Filed: Mar. 19, 2015

(86) PCT No.: PCT/JP2015/058364
§ 371 (c)(1),
(2) Date: Sep. 16, 2016

(87) PCT Pub. No.: WO2015/141806
PCT Pub. Date: Sep. 24, 2015

(65) Prior Publication Data
US 2017/0089389 A1    Mar. 30, 2017

(30) Foreign Application Priority Data

Mar. 19, 2014  (JP) ................................ 2014-056407
Mar. 6, 2015   (JP) ................................ 2015-044274

(51) Int. Cl.
*F16C 32/06*     (2006.01)
*F16C 33/10*     (2006.01)
(Continued)

(52) U.S. Cl.
CPC ........ *F16C 33/1095* (2013.01); *F16C 17/024* (2013.01); *F16C 17/042* (2013.01);
(Continued)

(58) Field of Classification Search
CPC ... F16C 33/1095; F16C 17/024; F16C 17/042
See application file for complete search history.

(56) References Cited

U.S. PATENT DOCUMENTS 4,435,839 A  *  3/1984  Gu ........................ F16C 17/024
                                                  29/898.02
7,297,367 B2 * 11/2007  Oboodi .................. F01D 25/22
                                                  427/226
(Continued)

FOREIGN PATENT DOCUMENTS

JP     2003-262222     9/2003
JP     2009-293733    12/2009
(Continued)

OTHER PUBLICATIONS

International Search Report issued May 12, 2015 in International (PCT) Application No. PCT/JP2015/058364.

*Primary Examiner* — Thomas R. Hannon
(74) *Attorney, Agent, or Firm* — Wenderoth, Lind & Ponack, L.L.P.

(57) ABSTRACT

Provided is a foil bearing, an air film is formed in a radial bearing gap between a first bearing surface arranged on a top foil and a second bearing surface along with rotation of a shaft, and the shaft is supported with a pressure of the air film. Lubricating powder is interposed between the bearing surfaces. The top foil is partially elastically deformed in a width direction of the radial bearing gap in accordance with the pressure of the air film generated in the radial bearing gap, thereby being alternately shifted between a first state in which a retaining portion capable of retaining the lubricating powder is formed and a second state in which the retaining portion substantially disappears, and shifted from the second state to the first state along with an increase in the pressure of the air film.

8 Claims, 5 Drawing Sheets

DURING HIGH-SPEED ROTATION (FIRST STATE)

(51) Int. Cl.
*F16C 17/04* (2006.01)
*F16C 17/02* (2006.01)
(52) U.S. Cl.
CPC ........ *F16C 33/101* (2013.01); *F16C 2360/23* (2013.01); *F16C 2360/24* (2013.01)

(56) References Cited

U.S. PATENT DOCUMENTS 8,070,873 B2 * 12/2011 Lee ........................... C23C 4/02
106/287.18
8,356,413 B2 * 1/2013 Weyant ................... C23C 4/185
29/898.12

FOREIGN PATENT DOCUMENTS

| JP | 2013-32797 | 2/2013 |
| WO | 2006/084587 | 8/2006 |

* cited by examiner

DURING STOPPED STATE AND LOW-SPEED ROTATION (SECOND STATE)

DURING HIGH-SPEED ROTATION (FIRST STATE)

DURING STOPPED STATE AND
LOW-SPEED ROTATION (SECOND STATE)

DURING HIGH-SPEED ROTATION
(FIRST STATE)

FOIL BEARING

TECHNICAL FIELD

The present invention relates to a foil bearing.

BACKGROUND ART

A main shaft of a turbo-machine (for example, a gas turbine or a turbocharger) is rotated at high speed under a high-temperature environment. Further, there is a case where the turbo-machine has a difficulty in being provided with a separate auxiliary machine for oil circulation from the viewpoints of energy efficiency, and there is also a case where shear resistance of a lubricating oil may be a factor for inhibiting high-speed rotation of the main shaft. Therefore, as a bearing for supporting the main shaft of the turbo-machine, an air dynamic pressure bearing is often used in place of a rolling bearing or a dynamic pressure bearing with oil lubrication.

In the air dynamic pressure bearing, both a bearing surface on a rotary side and a bearing surface on a stationary side are generally constructed of rigid bodies. However, in this type of air dynamic pressure bearing, when management of a gap width of a bearing gap formed between both the bearing surfaces is insufficient, self-excited whirling called a "whirl" becomes more liable to occur in the main shaft upon exceeding a stability limit. Thus, in a general air dynamic pressure bearing, the gap width of the bearing gap needs to be managed with high accuracy in order to stably exhibit desired bearing performance. However, under an environment accompanying with a large temperature change as in the turbo-machine, the gap width of the bearing gap is easily varied under the influence of thermal expansion. Therefore, there is difficulty in stably exhibiting the desired bearing performance.

There has been known a foil bearing as a bearing which is less liable to cause the whirl and enables management of a gap width of a bearing gap to be performed easily even under the environment in which a temperature change is large. The foil bearing has a bearing surface which is constructed of a flexible metal thin plate (foil) having low rigidity against bending. The foil bearing allows flexure of the bearing surface, to thereby support a load. For example, in Patent Literature 1 described below, there is described one type of a foil bearing configured to support a radial load.

In the foil bearing of Patent Literature 1, when a rotary shaft is rotated, an air film is formed in a radial bearing gap between a radially inner surface of a top foil (bearing foil) constructing a stationary side and an outer peripheral surface of the rotary shaft opposed to the radially inner surface of the top foil, and the rotary shaft is supported in a radial direction by the pressure of the air film. Further, in this foil bearing, the top foil and an elastic support portion (elastic body) configured to elastically support the top foil are elastically deformed in accordance with operation conditions such as a load acting on the top foil and ambient temperature, to thereby automatically adjust the gap width of the radial bearing gap. Therefore, the foil bearing has an excellent feature in stability as compared to a general dynamic pressure bearing, and can be suitably used as a bearing for supporting a rotary body which is rotated at high speed under the high-temperature environment, such as a rotor of the turbo-machine.

Further, in a general dynamic pressure bearing, the gap width of the radial bearing gap needs to be managed on the order of 1/1,000 of a shaft diameter. Thus, for example, when the general dynamic pressure bearing is used for supporting the rotary shaft having a diameter of about several millimeters, the gap width of the radial bearing gap needs to be managed to about several micrometers. However, when tolerance or thermal expansion amount at the time of manufacturing is taken into consideration, management of the gap width on the above-mentioned order is not easy to perform. In contrast, with the foil bearing, the gap width of the radial bearing gap is automatically adjusted through elastic deformation of the top foil (bearing surface) itself, and hence the gap width of the radial bearing gap only needs to be managed to about several tens of micrometers. Thus, the foil bearing also has an advantage in that manufacture of the foil bearing and management of the gap width of the bearing gap can be performed more easily as compared to the general dynamic pressure bearing.

The above-described advantages of the foil bearing can be similarly found in a type of foil bearing configured to support a thrust load.

Incidentally, particularly during low-speed rotation of the rotary shaft, rigidity (pressure) of the air film formed in the bearing gap is not sufficiently increased, and hence the bearing surfaces repeatedly come into slide contact with each other. In order to prevent abrasion of the bearing surfaces and an increase in rotation torque due to such slide contact to the largest extent possible, there has also been conceived to provide, on at least one of the bearing surfaces, a film exhibiting excellent abrasion resistance such as nickel plating or chromium plating, or a film exhibiting good lubricity such as a plating film or a resin coating in which a solid lubricant made of molybdenum disulfide, graphite, fluororesin, or the like is dispersed (see Patent Literature 1).

CITATION LIST

Patent Literature 1: JP 2003-262222 A

SUMMARY OF INVENTION

Technical Problem

Various types of foil bearings including the above-mentioned foil bearings have been demanded to achieve further reduced torque and longer service life. However, even the above-mentioned film to be formed on at least one of the bearing surfaces is found insufficient as a countermeasure for such demands.

Therefore, it is an object of the present invention to provide a foil bearing capable of achieving further reduced torque as well as longer service life.

Solution to Problem

According to one embodiment of the present invention, which has been devised to achieve the above-mentioned object, there is provided a foil bearing, comprising: a stationary side member; and a rotary side member, any one of the stationary side member and the rotary side member comprising: a top foil formed of a flexible metal thin plate; and an elastic support portion configured to elastically support the top foil, a first bearing surface arranged on the top foil, a second bearing surface of another member opposed to the first bearing surface, an air film formed in a bearing gap between the first bearing surface and the second bearing surface along with rotation of the rotary side member, the rotary side member supported with a pressure of the air film, and powder having lubricity and being interposed between the first bearing surface and the second bearing surface, wherein at least a part of the top foil is elastically deformed in a width direction of the bearing gap in accordance with the pressure of the air film to be shifted alternately between a first state in which a retaining portion capable of retaining the powder is formed and a second state in which the retaining portion substantially disappears, and shifted from the second state to the first state along with an increase in the pressure of the air film.

The bearing gap according to the present invention does not distinguish between a radial bearing gap and a thrust bearing gap. That is, the present invention is applicable to any one of the type of the foil bearing configured to support the radial load and the type of the foil bearing configured to support the thrust load.

According to the above-mentioned configuration, under a state in which the pressure of the air film formed in the bearing gap is low (mixed lubrication region or boundary lubrication region), such as immediately after activation of or immediately before stop of the foil bearing, the first bearing surface, rather than the second bearing surface, can be preferentially brought into contact with the powder having lubricity (hereinafter also referred to as "lubricating powder") interposed between the bearing surfaces. With this, a frictional force between the bearing surfaces can be reduced, to thereby achieve reduced torque. Thus, a local temperature rise in the bearing surfaces due to slide contact between the bearing surfaces and resulting deformation and seizure of the bearing surfaces can be effectively prevented. Further, when a general foil bearing is stopped, the bearing surfaces are typically in a state of being at least partially held in contact with each other. Thus, a large amount of energy is required after the start of operation of the bearing to achieve a steady rotation state (fluid lubrication region). In contrast, when the foil bearing according to the present invention is stopped, the top foil is under the second state in which the above-mentioned retaining portion substantially disappears. Thus, the lubricating powder interposed between the bearing surfaces serves as a spacer, to thereby not only reduce the frictional force between the bearing surfaces but also form a space between the bearing surfaces to facilitate incorporation of air between the bearing surfaces. Therefore, the steady rotation state can be promptly achieved without requiring a large amount of energy after starting operation of the bearing. Thus, starting torque can be significantly reduced, and a rotation speed required for supporting the member on the rotary side in a non-contact manner is decreased, thereby reducing a load on the bearing surfaces and improving durability.

Not all of the lubricating powder interposed between the bearing surfaces is retained by the retaining portion also during the steady rotation of the rotary side member, that is, when the top foil is in the first state. There can be conceived that at least a part of the lubricating powder flows in the bearing gap together with lubricating fluid (air) or is under the state of adhering to any one of the bearing surfaces. Thus, even when the bearing surfaces are brought into slide contact with each other by some chance during the steady rotation, the local temperature rise in the bearing surfaces and resulting deformation and seizure of the bearing surfaces can be effectively prevented. Further, there can be conceived that, when the foil bearing according to the present invention is repeatedly activated and stopped, the slide contact between the lubricating powder and the bearing surface, application of pressure on the lubricating powder by the bearing surfaces, and the like repeatedly occur, with the result that the lubricating powder adheres to and deposits on one or both of the bearing surfaces to form a film having excellent lubricity. With this, reduced torque can be achieved in all of lubrication regions (rotation speed regions). In the manner described above, the foil bearing with further reduced torque and longer service life can be achieved.

Herein, there can be conceived that reduced torque and the like in the foil bearing can be achieved by only allowing the lubricating powder to be interposed between the bearing surfaces without providing the top foil with the function of switching between retaining and not retaining the lubricating powder, as in the present invention. However, when an excessive amount of the lubricating powder is interposed between the bearing surfaces, the volume ratio of the lubricating powder with respect to the lubricating fluid (air) in the bearing gap is increased. Thus, in particular, there is a possibility of inducing degradation of the rigidity, that is, degradation of the supporting performance of the air film formed in the bearing gap during the steady rotation. Further, when a large amount of powder enters the bearing gap at once, the powder may be bitten by the bearing surfaces, thereby causing an adverse effect on the bearing function itself. Therefore, as in the present invention, the top foil is provided with the function of retaining the lubricating powder during the steady rotation (fluid lubrication region) so that the supply amount of the lubricating powder to the bearing gap can be restricted while allowing a sufficient amount of lubricating powder to be interposed between the bearing surfaces mainly during the stopped state and the low-speed rotation state (mixed lubrication region and boundary lubrication region). Thus, sufficiently reduced friction and reduced torque during the low-speed rotation or other states can be achieved without inducing the degradation of the supporting performance during the steady rotation. Further, the top foil is formed of a flexible metal thin plate and may be elastically deformed as needed in accordance with the pressure of the air film, and hence the above-mentioned functions and effects can be easily and effectively given by merely suitably adjusting the shape and the like of the elastic support portion, for example.

As the lubricating powder, for example, an oxide of abrasion powder generated through abrasion of at least one of a base material of the top foil and a base material of another member (for example, a shaft) due to the slide contact between the bearing surfaces can be used. However, in this case, at the stage of starting the use of the foil bearing (initial period of using a new foil bearing), no lubricating powder is interposed between the bearing surfaces, and hence the bearing surfaces are brought into slide contact with each other under a state of not being lubricated. Thus, there is a possibility that starting torque and rotation torque during the low-speed rotation may be increased and that base materials of two members (for example, top foil and shaft) forming the bearing gap may be severely abraded. As technical measures for solving such problems as promptly as possible or for avoiding occurrence of the above-mentioned problems, there can be conceived to employ at least one of the following items (1) to (3).

(1) To provide, on at least one of the bearing surfaces, a protruding portion which protrudes toward another bearing surface side.

(2) To include, in the lubricating powder, a solid lubricant which is different from the abrasion powder of the base materials of the top foil and another member.

(3) To arrange at least one of the first bearing surface and the second bearing surface on a lubricating film formed on the base material.

Specifically, when the configuration of the above-mentioned item (1) is employed, a contact area between the bearing surfaces is reduced so that reduced torque can be achieved, and a high contact pressure acts on the protruding portion during the slide contact between the bearing surfaces so that fine abrasion powder is obtained at an early stage. Therefore, the lubricating powder can be promptly interposed between the bearing surfaces. Further, when the configuration of the above-mentioned item (2) is employed, the lubricating powder can be interposed between the bearing surfaces from the stage of starting use of the foil bearing. Thus, starting torque at the stage of starting use of the foil bearing and rotation torque during the low-speed rotation can be reduced. Further, the abrasion of the base material becomes mild abrasion, and hence the oxide of the generated abrasion powder also serves as the lubricating powder. Further, when the configuration of the above-mentioned item (3) is employed, the lubricating powder can be generated through abrasion of the lubricating film. Thus, starting torque at the stage of starting use of the foil bearing and rotation torque during the low-speed rotation can be reduced. Further, the abrasion of the base material becomes mild abrasion, and hence the oxide of the generated abrasion powder also serves as the lubricating powder.

The foil bearing according to the present invention has the features as described above. Therefore, the foil bearing can be suitably used as a bearing for supporting a rotary side member which is rotated at high speed such as a rotor of a turbo-machine (for example, gas turbine and turbocharger).

Advantageous Effects of Invention

From the description above, according to the present invention, the foil bearing capable of attaining further reduced torque and longer service life can be achieved.

DESCRIPTION OF EMBODIMENTS

Now, description is made of embodiments of the present invention with reference to the drawings.

Figure 1:
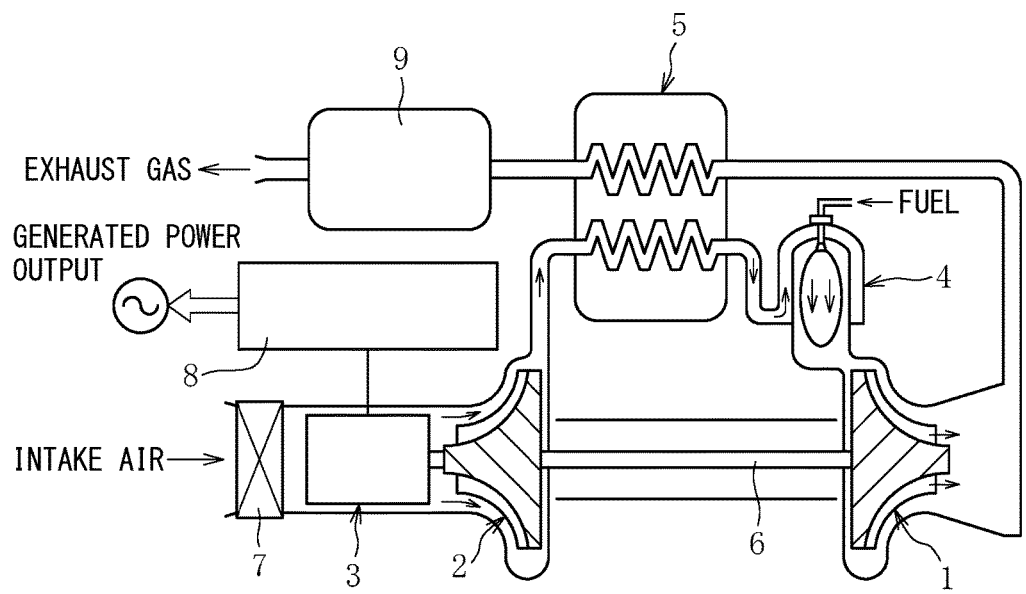
FIG. 1 is a view for conceptually illustrating a configuration of a micro gas turbine for which a foil bearing according to the present invention is used.

In FIG. 1, a configuration of a gas turbine device which is called a "micro gas turbine" is conceptually illustrated as one example of a turbo-machine. This gas turbine device comprises, as a main configuration, a turbine 1 forming a blade cascade, a compressor 2, a power generator 3, a combustor 4, and a regenerator 5. The turbine 1 and the compressor 2 are mounted to a shaft 6 extending in a horizontal direction to construct a rotor on a rotary side together with the shaft 6. One end of the shaft 6 in an axial direction thereof is coupled to the power generator 3. When this micro gas turbine is operated, air is taken in through an intake port 7. The taken-in air is compressed by the compressor 2 and heated by the regenerators, and thereafter sent to the combustor 4. The combustor 4 mixes fuel into the compressed and heated air and combusts mixture of fuel and the air, to thereby generate high-temperature and high-pressure gas and rotate the turbine 1 with this gas. When the turbine 1 is rotated, a rotary force thereof is transmitted to the power generator 3 through the shaft 6, to thereby drive the power generator 3 to rotate. Power generated by driving the power generator 3 to rotate is output through an inverter 8. Temperature of the gas after the rotation of the turbine 1 is relatively high. Thus, the gas is delivered to the regenerator 5 to perform heat exchange with compressed gas before combustion, thereby reusing the heat of the gas after combustion. The gas after completion of the heat exchange in the regenerator 5 passes through a waste heat collecting device 9, and is then discharged as exhaust gas.

Figure 2:
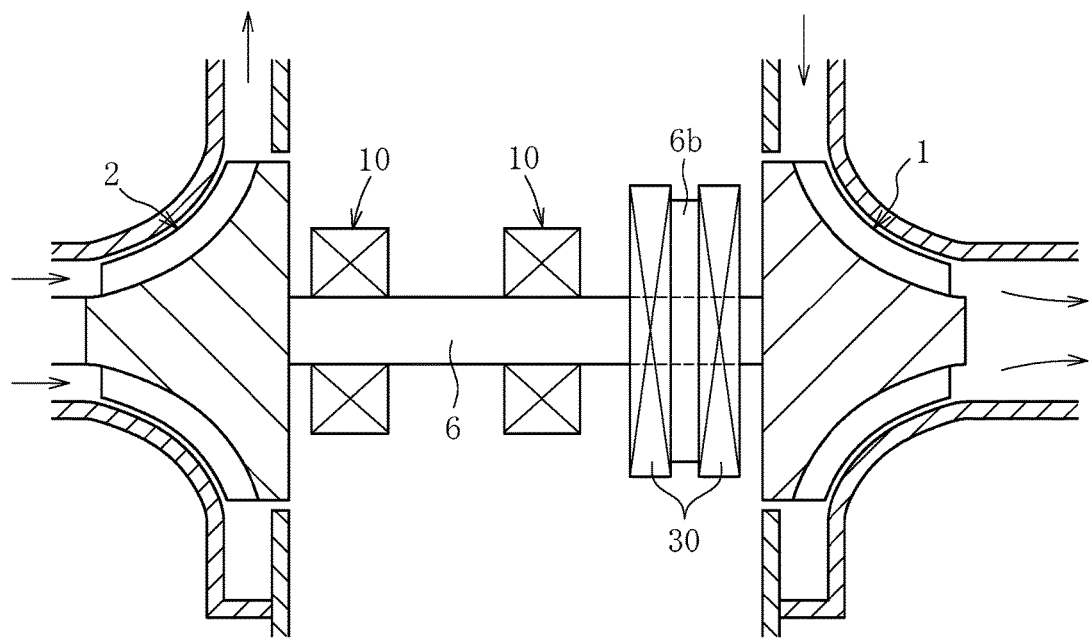
FIG. 2 is a view for conceptually illustrating a support structure for a rotor in the micro gas turbine.

In FIG. 2, one example of a support structure for the rotor in the micro gas turbine illustrated in FIG. 1 is conceptually illustrated. In this support structure, radial bearings 10 are arranged at two locations separated apart in the axial direction of the shaft 6, and thrust bearings 30 and 30 are arranged on both sides of a flange portion 6b in an axial direction thereof, the flange portion 6b being arranged on the shaft 6. The shaft 6 is supported by these radial bearings 10 and thrust bearings 30 rotatably in both the radial direction and the thrust direction. In this support structure, a region between the turbine 1 and the compressor 2 has a high-temperature atmosphere because the region is adjacent to the turbine 1, which is rotated by the high-temperature and high-pressure gas. In addition, the shaft 6 is rotated at a rotation speed of several ten thousand rpm or higher. Therefore, as the bearings 10 and 30 to be used in this support structure, air dynamic pressure bearings or, in particular, foil bearings are suitable.

In the following, a foil bearing which is an embodiment of the present invention and is suitable for the radial bearing 10 to be used for the above-mentioned micro gas turbine is described with reference to the drawings. The foil bearing suitable for the radial bearing 10 is hereinafter referred to as "foil bearing 10".

Figure 3:
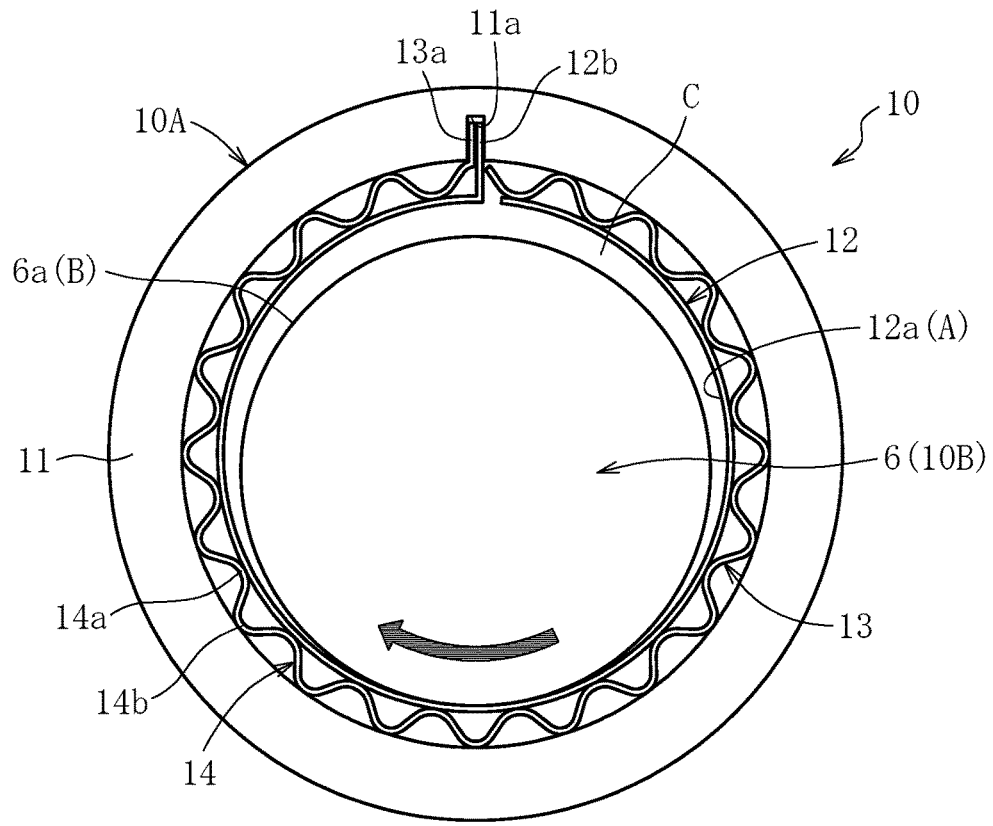
FIG. 3 is an axis-orthogonal sectional view of a foil bearing according to one embodiment of the present invention.

In FIG. 3, an axis-orthogonal sectional view of the foil bearing 10 according to one embodiment of the present invention is illustrated. The foil bearing 10 illustrated in FIG. 3 is of a type which is also called a "bump type", and comprises a cylindrical outer member 11 fixed to an inner periphery of a casing (not shown), a shaft 6 made of an iron-based metal material and inserted along an inner periphery of the outer member 11, and a top foil 12 and a back foil 13 retained (fixed) along the inner periphery of the outer member 11. In this embodiment, the outer member 11 and the top foil 12 and the back foil 13 retained by the outer member 11 construct a stationary side member 10A, and the shaft 6 constructs a rotary side member 10B. A first bearing surface A is formed on an inner peripheral surface 12a of the top foil 12. A second bearing surface B is formed on an outer peripheral surface 6a of the shaft 6 so as to form a wedge-shaped radial bearing gap C with the first bearing surface A during rotation of the shaft 6. In this embodiment, both of the bearing surfaces A and B are formed into smooth surfaces having no fine protrusions and recesses.

The top foil 12 is formed into a cylindrical shape having ends in a circumferential direction by, for example, rolling up a flexible band plate formed of an iron-based metal having a thickness of from about 20 μm to about 200 μm, and fitting a bent portion 12b formed at one end portion in the circumferential direction into a groove portion 11a of the outer member 11 so as to be retained by the outer member 11. Further, as with the top foil 12, the back foil 13 is formed into a cylindrical shape having ends in a circumferential direction by rolling up a flexible band plate formed of an iron-based metal having a thickness of from about 20 μm to about 200 μm, and fitting a bent portion 13a formed at one end portion in the circumferential direction into the groove portion 11a of the outer member 11 so as to be fixed to the outer member 11. The back foil 13 includes an elastic support portion 14 configured to elastically support the top foil 12, and the elastic support portion 14 of the illustrated example is constructed by arc-shaped convex portions 14a and concave portions 14b arranged alternately in the circumferential direction.

Although not illustrated, the top foil 12 and the back foil 13 may each be provided with a retaining portion configured to prevent removal from the outer member 11. As the retaining portion, there may be employed, for example, a flange portion configured to be engaged with an end surface of the outer member 11 in an axial direction. Further, as the foil member, there may be used a foil member in which the top foil 12 and the back foil 13 are integrally arranged.

A rotation direction of the shaft 6 is set to be a direction in which a gap width of a circumferential gap between one circumferential end and another circumferential end of each of the top foil 12 and the back foil 13 is expanded. That is, the foil bearing 10 illustrated in FIG. 3 supports the shaft 6 rotating in a clockwise direction as indicated by the solid black arrow in FIG. 3.

In the foil bearing 10 having the above-mentioned configuration, when the shaft 6 is rotated, the wedge-shaped radial bearing gap C is formed between the first bearing surface A arranged on the inner peripheral surface 12a of the top foil 12 and the second bearing surface B arranged on the outer peripheral surface 6a of the shaft 6. When the rotation speed of the shaft 6 increases to sufficiently increase the pressure of the air film generated in the radial bearing gap C, the shaft 6 is supported in a non-contact manner with respect to the outer member 11 rotatably in the radial direction.

During the rotation of the shaft 6, the flexible top foil 12 is elastically deformed as needed in accordance with changes in a load (pressure of the air film) acting on the first bearing surface A, the peripheral temperature, and other factors, and hence the gap width of the radial bearing gap C is automatically adjusted to an appropriate width in accordance with operation conditions. Such an automatic adjustment function for the gap width enables stable support for the rotation of the shaft 6. In FIG. 3, the gap width of the radial bearing gap C is illustrated in an exaggerated manner to facilitate understanding.

Further, due to reasons such as that the top foil 12 is elastically supported by the elastic support portion 14 arranged on the back foil 13 and that the top foil 12 and the back foil 13 (elastic support portion 14) as well as the back foil 13 and the outer member 11 are slidable with each other, the automatic adjustment function for the gap width of the radial bearing gap C is enhanced, and vibration generated by the rotation of the shaft 6 can be effectively attenuated. Therefore, the gap width of the radial bearing gap C can be managed within an appropriate range even under harsh operation conditions such as high-temperature and high-speed rotation, and hence the rotation of the shaft 6 is supported more stably.

Figure 4:
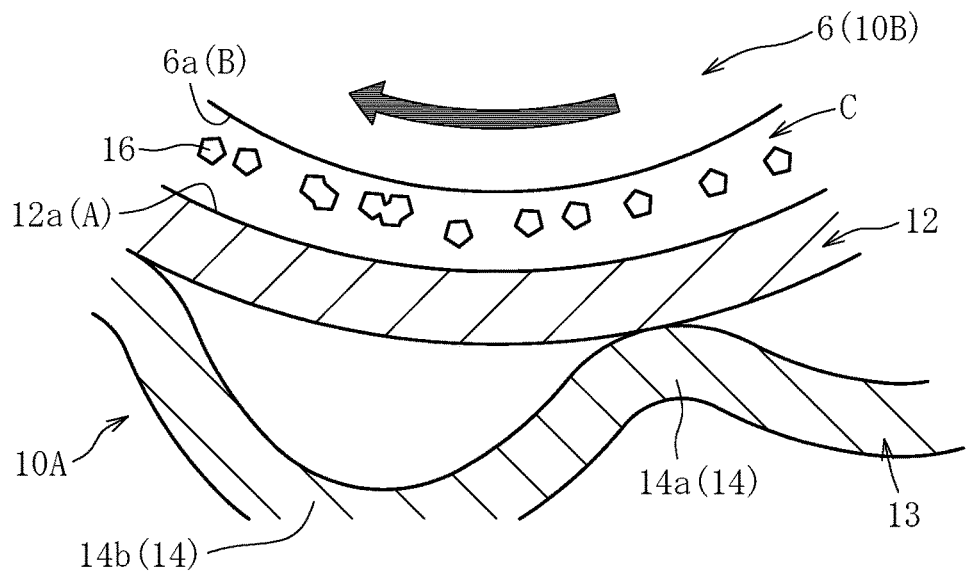
FIG. 4 is an enlarged view for illustrating relevant portions of FIG. 3 and is a schematic view for illustrating a top foil in a second state.
Figure 5:
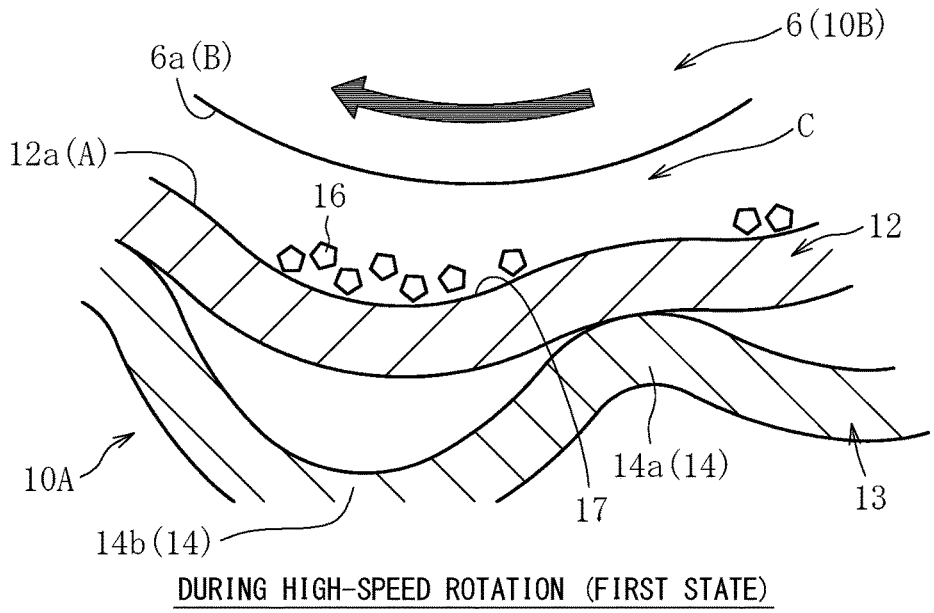
FIG. 5 is an enlarged view for illustrating the relevant portions of FIG. 3 and is a schematic view for illustrating the top foil in a first state.

In this foil bearing 10, as illustrated in FIG. 4 and FIG. 5 in an enlarged manner, powder 16 having lubricity (hereinafter referred to as "lubricating powder 16") is interposed between the first bearing surface A and the second bearing surface B (radial bearing gap C). The lubricating powder 16 to be used is made of material different from base materials of the shaft 6 and the top foil 12, and does not melt or dissolve under the high-temperature atmosphere in which the foil bearing 10 is to be used. In this embodiment, iron oxide powder is used. The iron oxide powder used for the lubricating powder 16 is obtained from metal abrasion powder (iron-based powder), which is generated through abrasion of the base material of at least one of the top foil 12 and the shaft 6 along with repeated slide contact between the bearing surfaces A and B after the start of operation of the foil bearing 10 until the steady rotation state of the shaft 6 is achieved, and oxidized through exposure to the air in the radial bearing gap C.

Further, in this foil bearing 10, the top foil 12 is configured such that at least a part of the top foil 12 is elastically deformed in a width direction (radial direction in this embodiment) of the bearing gap in accordance with the pressure of the air film generated in the radial bearing gap C, to thereby shift alternately between a first state in which a retaining portion 17 capable of retaining the lubricating powder 16 interposed between the bearing surfaces A and B is formed (see FIG. 5) and a second state in which the retaining portion 17 substantially disappears (see FIG. 4), and shift from the second state to the first state along with an increase in the pressure of the air film (shift from the first state to the second state along with a decrease in the pressure of the air film).

More specifically, under the state in which the pressure of the air film generated in the radial bearing gap C is sufficiently increased as during the steady rotation of the shaft 6, at least a part (portion which is arranged on a radially inner side of the concave portions 14b constructing the elastic support portion 14) of the top foil 12 (first bearing surface A) is elastically deformed toward a radially outer side upon receiving the pressure of the air film, to thereby form the concave retaining portion 17. The lubricating powder 16 interposed between the bearing surfaces A and B is retained in this retaining portion 17 (see FIG. 5). Meanwhile, a configuration may be employed such that, as in the stopped state of the shaft 6, immediately after activation of the shaft 6, or immediately before stopping the shaft 6, the first bearing surface A of the top foil 12 forms a smooth cylindrical shape (retaining portion 17 substantially disappears), and the lubricating powder 16 freely disperses and floats between the bearing surfaces A and B (see FIG. 4) in a state in which the rotation speed of the shaft 6 is not sufficiently increased and the pressure of the air film generated in the radial bearing gap C is not sufficiently increased.

Thus, according to the above-mentioned configuration, in the so-called mixed lubrication region or boundary lubrication region in which the pressure of the air film in the radial bearing gap C is not sufficiently increased, the first bearing surface A can be preferentially brought into contact with the lubricating powder 16 interposed between the bearing surfaces A and B rather than with the second bearing surface B. With this, a frictional force between the bearing surfaces A and B can be reduced, to thereby achieve reduced torque. Further, a local temperature rise in the bearing surfaces A and B caused by the slide contact between the bearing surfaces A and B, and resulting deformation and seizure of the bearing surfaces A and B can also be effectively prevented. An average particle size of the lubricating powder 16 to be interposed between the bearing surfaces A and B is preferred to be equal to or more than a surface roughness (arithmetic average roughness defined in JIS B 0601) of the bearing surfaces A and B and equal to or less than a thickness of the air film formed in the radial bearing gap C during steady rotation of the shaft 6 (fluid lubrication region).

Further, when a general foil bearing is stopped, a stationary side member and a rotary side member (bearing surfaces A and B) are typically in a state of being at least partially held in contact with each other, and hence a large amount of energy is required after the start of operation of the bearing to achieve the steady rotation state. In contrast, when the foil bearing 10 according to the present invention is stopped, the top foil 12 is in the second state of allowing the lubricating powder 16 to freely disperse and float between the bearing surfaces A and B (see FIG. 4), and hence the lubricating powder 16 interposed between the bearing surfaces A and B serves as a spacer. With this, not only the frictional force between the bearing surfaces is reduced, but also a space is formed between the bearing surfaces A and B, to thereby facilitate incorporation of the air into the space between the bearing surfaces A and B. Therefore, after operation of the foil bearing 10 is started, the steady rotation state can be achieved promptly without requiring a large amount of energy. Thus, starting torque can be significantly reduced, and the rotation speed necessary for supporting the shaft 6 in a non-contact manner is decreased, thereby reducing the load on the bearing surfaces A and B and improving the durability.

There can be conceived that not all of the lubricating powder 16 is retained in the retaining portion 17 during the steady rotation of the shaft 6, that is, when the top foil 12 is in the first state (see FIG. 5), and that at least a part of the lubricating powder 16 adheres to any one of or both of the bearing surfaces A and B, or floats or flows in the radial bearing gap C. In particular, air having a viscosity smaller than that of liquid such as a lubricating oil is employed as a lubricating fluid in this foil bearing 10, and hence the lubricating powder 16 is less likely to be removed from the bearing surfaces A and B even when the lubricating powder 16 adhering to the bearing surfaces A and B receives a flowing force of the lubricating fluid. Therefore, even when the bearing surfaces A and B are brought into slide contact with each other by some chance during the steady rotation of the shaft 6, the local temperature rise in the bearing surfaces A and B and resulting deformation and seizure of the bearing surfaces A and B can be effectively prevented. Further, in the foil bearing 10 according to the present invention, when the foil bearing 10 is activated and stopped repeatedly, the slide contact between the lubricating powder 16 and the bearing surfaces A and B, application of pressure on the lubricating powder 16 by the bearing surfaces A and B, and other phenomena are repeated. Therefore, there can be conceived that the lubricating powder 16 adheres to or deposits on any one of or both of the bearing surfaces A and B to form a lubricating film. With this, reduced torque can be achieved in all of the lubrication regions (rotation speed regions). Thus, the foil bearing 10 with further reduced torque and longer service life can be achieved.

Herein, reduced torque and the like in the foil bearing 10 can be achieved by only allowing the lubricating powder 16 to be interposed between the bearing surfaces A and B without providing the top foil 12 with the function of switching between retaining and not retaining the lubricating powder 16 as in the present invention. However, when an excessive amount of the lubricating powder 16 is interposed between the bearing surfaces A and B, the volume ratio of the lubricating powder 16 with respect to the air in the radial bearing gap C is increased. Thus, in particular, there is a possibility of inducing degradation of the rigidity, that is, degradation of the supporting performance of the air film formed in the radial bearing gap C during the steady rotation. Further, when a large amount of the lubricating powder 16 enters the radial bearing gap C at once, the bearing surfaces A and B may bite the lubricating powder 16, thereby causing an adverse effect on the bearing function itself. Therefore, as illustrated in FIG. 5, the top foil 12 is preferred to have the function of retaining the lubricating powder 16 in the retaining portion 17 during the steady rotation (fluid lubrication region) so that the supply amount (dispersion amount) of the lubricating powder 16 to the radial bearing gap C can be restricted while allowing a sufficient amount of lubricating powder 16 to be interposed between the bearing surfaces A and B during the stopped state and the low-speed rotation state (mixed lubrication region and boundary lubrication region) of the bearing as illustrated in FIG. 4. This is because such a configuration can achieve sufficiently smaller frictional force and reduced torque during the low-speed rotation without inducing the degradation of the supporting performance during the steady rotation. The top foil 12 is formed of a flexible metal thin plate and may be elastically deformed as needed in accordance with the pressure of the air film and the like, and hence the above-mentioned functions and effects can be easily and effectively given by merely suitably adjusting the shape of the elastic support portion 14 and the like.

One embodiment of the foil bearing 10 according to the present invention is described above. However, the foil bearing 10 can be suitably changed without departing from the scope of the present invention.

Figure 6A:
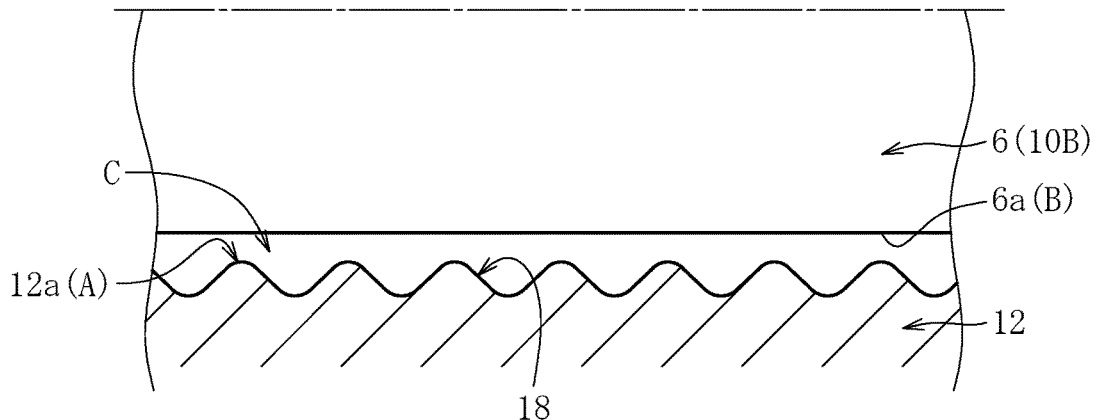
FIG. 6A is an enlarged view for illustrating relevant portions of a foil bearing according to a modified example and is a schematic view for illustrating a state before starting use of this foil bearing.

For example, as in the embodiment described above, when only the oxide powder obtained from the abrasion powder of iron-based metal, which is the base material for the top foil 12 or the shaft 6, is used as the lubricating powder 16, the lubricating powder 16 is not interposed between the bearing surfaces A and B at a stage of starting use of a new foil bearing 10, and hence starting torque or rotation torque during the low-speed rotation is inevitably increased. In order to solve such a problem as promptly as possible, at least one of the bearing surfaces A and B may have fine protruding portions protruding toward another bearing surface side. FIG. 6A is an illustration of one example thereof in which a plurality of fine protruding portions 18 are arranged on the first bearing surface A of the top foil 12.

Figure 6B:
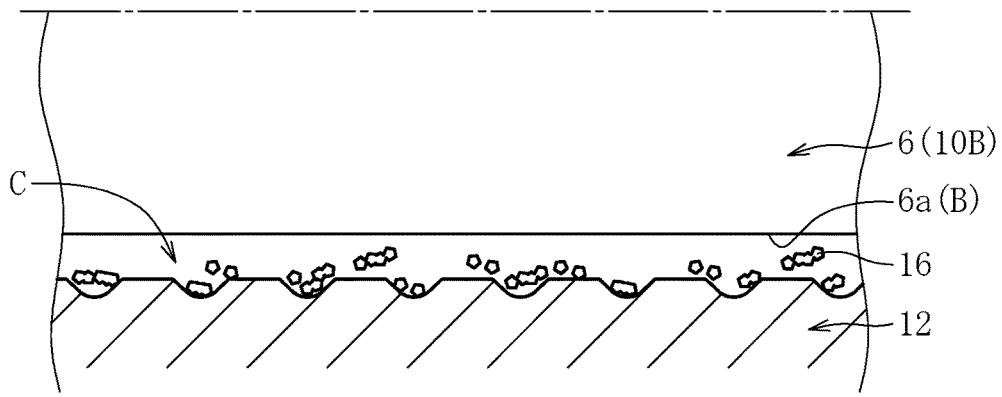
FIG. 6B is an enlarged view for illustrating the relevant portions of the foil bearing according to the modified example and is a schematic view for illustrating a state during use of this foil bearing.

In such a manner, a contact area between the bearing surfaces A and B is reduced, to thereby attain reduced torque. Further, the space is formed between the bearing surfaces A and B to facilitate incorporation of the air into the space between the bearing surfaces A and B, thereby enabling reduction of starting torque. Further, at the time of slide contact between the bearing surfaces A and B, a high contact pressure acts on the protruding portions 18, thereby allowing the abrasion powder and therefore the lubricating powder 16 to be promptly interposed between the bearing surfaces A and B (see FIG. 6B). When the height and the number of protruding portions 18 to be placed are adjusted, the particle size and the amount of the lubricating powder 16 (lubricating powder 16 made of an oxide of the abrasion powder) to be interposed between the bearing surfaces A and B can be controlled.

Further, although not illustrated, at least one of the first bearing surface A and the second bearing surface B may be arranged on the lubricating film formed on the base material (base material surface). That is, the lubricating film may be arranged on at least one of the inner peripheral surface 12a of the top foil 12 and the outer peripheral surface 6a of the shaft 6 at a portion facing the radial bearing gap C, and the bearing surface may be constructed by this lubricating film. In such a manner, in particular, even when the shaft 6 and the top foil 12 are made of the same kind of material and the bearing surfaces A and B are repeatedly brought into slide contact with each other at the stage of starting the use of the foil bearing 10 with no lubricating powder 16 interposed between the bearing surfaces A and B, severe abrasion between the bearing surfaces A and B and resulting occurrence of crucial failure such as adhesion between the slide contact portions of the bearing surfaces A and B can be effectively prevented. The above-mentioned lubricating film does not need to have a particular abrasion resistance, and may be abraded at an early stage. The abrasion powder of the lubricating film exhibits the lubricating action. Thus, even when the base materials of the shaft 6 and the top foil 12 are abraded, the abrasion may be mild abrasion, thereby avoiding the situation leading to adhesion. Further, fine abrasion powder of the base material generated by the mild abrasion is immediately oxidized and serves as the lubricating powder 16.

Thus, various types of the lubricating films may be employed. For example, a relatively soft coating film which has dispersed therein one kind or a plurality of kinds of powder which may generate abrasion powder to serve as the lubricating powder 16 (for example, generally available solid lubricant powder or iron oxide powder typified by molybdenum disulfide powder, tungsten disulfide powder, and the like), or a film such as a DLC film exhibiting excellent abrasion resistance can be employed. However, when the DLC film is to be formed, the DLC film is preferred to be formed on the outer peripheral surface 6a of the shaft 6 rather than on the inner peripheral surface 12a of the top foil 12 formed of a metal thin plate. This is for the purpose of preventing thermal deformation of the base material during formation of the film. As described above, even when either one of the bearing surfaces A and B is arranged on the lubricating film formed on the base material surface, at least one of the bearing surfaces A and B may have fine protruding portions 18 (see FIG. 6A) protruding toward another bearing surface side.

Further, although not illustrated, the lubricating powder 16 to be interposed between the bearing surfaces A and B may contain solid lubricant powder which is different from the abrasion powder made of the base materials of the top foil 12 and the shaft 6. That is, the solid lubricant powder may be interposed in advance between the bearing surfaces A and B of the foil bearing 10 before the start of use (new foil bearing 10). With this, the lubricating powder 16 can be interposed between the bearing surfaces A and B from the stage of starting the use of the new foil bearing 10, and hence the above-mentioned functions and effects can be effectively given. There is no particular limitation on the solid lubricant powder to be used in this case. However, an average particle size of the solid lubricant powder is preferred to be equal to or more than the surface roughness (arithmetic average roughness defined in JIS B 0601) of the bearing surfaces A and B and equal to or less than the thickness of the air film formed in the radial bearing gap C during the steady rotation.

As described above, when the solid lubricant powder is to be interposed in advance between the bearing surfaces A and B, and hardness of the solid lubricant powder is higher than that of the base material of the top foil 12 or the shaft 6, the solid lubricant powder serves as abrasive grain, thereby facilitating generation of the abrasion powder of the base material and oxide powder thereof (lubricating powder 16). Meanwhile, when the hardness of the solid lubricant powder is substantially equal to that of the base material of the top foil 12 or the shaft 6, or lower than that of the base material, there is an advantage in that reduced torque can be achieved from the stage of starting use of the foil bearing 10. From the description above, there is no particular limitation on the solid lubricant powder to be used in this case, and, for example, powder of a metal oxide such as oxide iron ($Fe_2O_3$) or alumina ($Al_2O_3$), powder of a disulfide such as molybdenum disulfide ($MoS_2$) or tungsten disulfide ($WS_2$), powder of a soft metal such as copper (Cu), silver (Ag), tin (Sn), zinc (Zn), or the like, or carbon-based powder as typified by graphite powder can be used. One kind or a mixture of a plurality of kinds of the solid lubricant powders exemplified above may be used.

Figure 7:
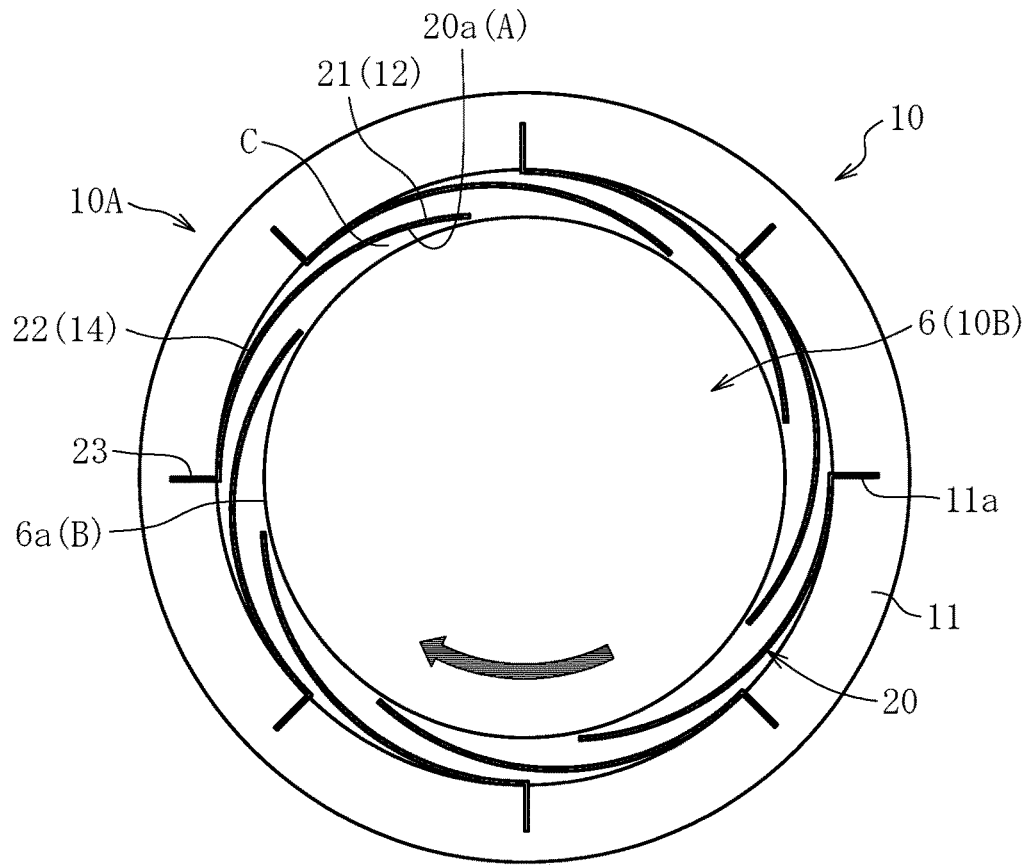
FIG. 7 is an axis-orthogonal sectional view of a foil bearing according to another embodiment of the present invention, which is a foil bearing of a type called a "leaf type".

As described above, the present invention is applied to the foil bearing 10 of a type which is called a "bump type". However, the present invention can also be suitably applied to a so-called leaf-type foil bearing. FIG. 7 is an illustration of one example of the leaf-type foil bearing 10 configured to support a radial load. A stationary side member 10A is constructed by the outer member 11 and a plurality of (eight in the illustrated example) leaves 20 fixed to the outer member 11. Each leaf 20 includes a rear end 22 having a bent portion 23 to be fixed to the groove portion 11a of the outer member 11 and a front end 21 being a free end separated apart from the rear end 22 in a circumferential direction. A region of each leaf 20 including the front end 21 serves as the top foil 12, and a region of each leaf 20 including the rear end 22 serves as the elastic support portion 14. When the shaft 6 is rotated, the wedge-shaped radial bearing gap C is formed between the first bearing surface A arranged on a radially inner surface on the front end 20a side of each leaf 20 and the outer peripheral surface 6a (second bearing surface B) of the shaft 6 opposed thereto. The shaft 6 is supported in the radial direction by the pressure of the air film generated in each radial bearing gap C.

Figure 8A:
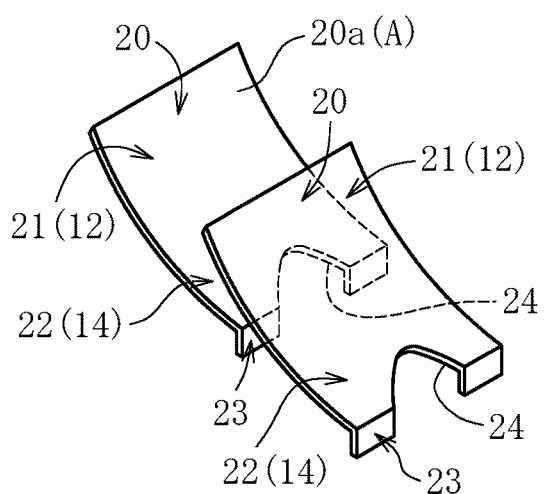
FIG. 8A is a perspective view for illustrating relevant portions of the foil bearing illustrated in FIG. 7 and is a schematic view for illustrating the top foil in the second state.
Figure 8B:
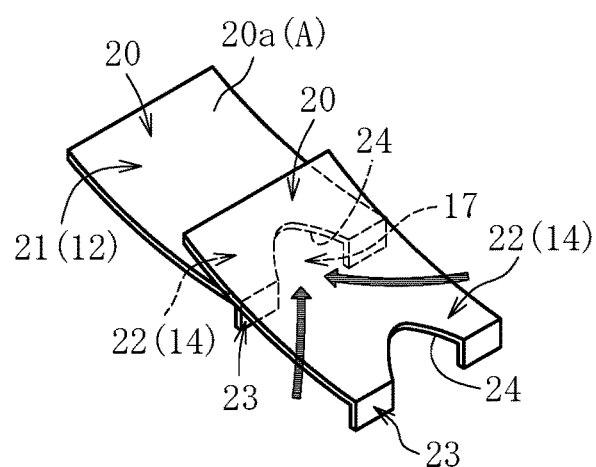
FIG. 8B is a perspective view for illustrating the relevant portions of the foil bearing illustrated in FIG. 7 and is a schematic view for illustrating the top foil in the first state.

In the leaf-type foil bearing 10 illustrated in FIG. 7, when the pressure of the air film generated in the radial bearing gap C increases, the front end 21 side (top foil 12) of the leaf 20 is elastically deformed toward a radially outer side by being pressed toward the rear end 22 side of the leaf 20 adjacent to the forward side in the rotation direction of the shaft 6, thereby falling under a first state in which the retaining portion 17 capable of retaining the lubricating powder 16 (not shown) interposed between the bearing surfaces A and B is formed (see FIG. 8B). Meanwhile, when the pressure of the air film generated in the radial bearing gap C is reduced, the front end 21 side of the leaf 20 is elastically deformed toward a radially inner side, thereby shifting to a second state in which the retaining portion 17 substantially disappears (see FIG. 8A). That is, also in this leaf-type foil bearing 10, as with the bump-type foil bearing 10 mainly illustrated in FIG. 3 to FIG. 5, the front end 21 of each leaf 20 serving as the top foil 12 is elastically deformed in a width direction (radial direction) of the radial bearing gap C in accordance with the pressure of the air film generated in the radial bearing gap C. This results in shifting alternately between the first state of forming the retaining portion 17 capable of retaining the lubricating powder 16 and the second state in which the retaining portion 17 substantially disappears, and shifting from the second state to the first state along with the increase in the pressure of the air film.

Thus, when the lubricating powder 16 is interposed between the bearing surfaces A and B, reduced torque and longer service life can be attained concurrently as with the bump-type foil bearing 10 illustrated in FIG. 3. Although not illustrated and described in detail, also in the foil bearing 10 illustrated in FIG. 7, the lubricating powder 16 to be used may be (only) the oxide of the abrasion powder generated by abrasion of a base material of at least one of the top foil 12 (leaf 20) and the shaft 6 along with the slide contact between the bearing surfaces A and B, or lubricating powder containing solid lubricant powder different from the abrasion powder of the base materials of the leaf 20 and the shaft 6. Further, at least one of the bearing surfaces A and B may include fine protruding portions 18 (see FIG. 6A) protruding toward another bearing surface side, or at least one of the bearing surfaces A and B may be arranged on the lubricating film formed on the base material. To summarize, the leaf-type foil bearing 10 as illustrated in FIG. 7 can also employ any configuration that may be employed in the bump-type foil bearing 10 illustrated in FIG. 6.

Further, in each leaf 20, as illustrated in FIG. 8A and FIG. 8B, there may be employed a draw-in portion 24 configured to actively draw in the lubricating powder 16 interposed between the bearing surfaces A and B into the retaining portion 17 formed between two leaves 20 and 20 adjacent to each other (the state in which a draw-in force is acting is indicated by the black solid arrows in FIG. 8B) in accordance with the increase in the pressure of the air film generated in the radial bearing gap C (in accordance with the elastic deformation of the front end 21 side of the leaf 20 toward the radially outer side). In the illustrated example, the draw-in portion 24 is constructed by a V-shape cutout portion formed at the rear end 22 side of the leaf 20 (more specifically, a V-shape cutout portion having a width dimension gradually reduced toward the front side in the rotation direction of the shaft 6).

As described above, the present invention is applied to the foil bearing 10 in which the top foil 12 and the elastic support portion 14 are arranged in the outer member 11 constructing the stationary side member 10A. However, the present invention is also suitably applicable to the foil bearing 10 in which the top foil 12 and the elastic support portion 14 are arranged in the shaft 6 constructing the rotary side member 10B (not shown). Further, the present invention is also applicable to the foil bearing 10 in which the outer member 11 constructs the rotary side member 10B and in which the shaft 6 constructs the stationary side member 10A (not shown).

Further, although not illustrated, the present invention is applicable not only to the type of the foil bearing 10 configured to support the radial load as described above, but also to the type of the foil bearing configured to support the thrust load (for example, the thrust bearing 30 illustrated in FIG. 2).

Further, the foil bearing according to the present invention can be suitably used not only for supporting a rotor of a turbo-machine such as a micro gas turbine, but also for supporting other rotary bodies.

EXAMPLES

Figure 9:
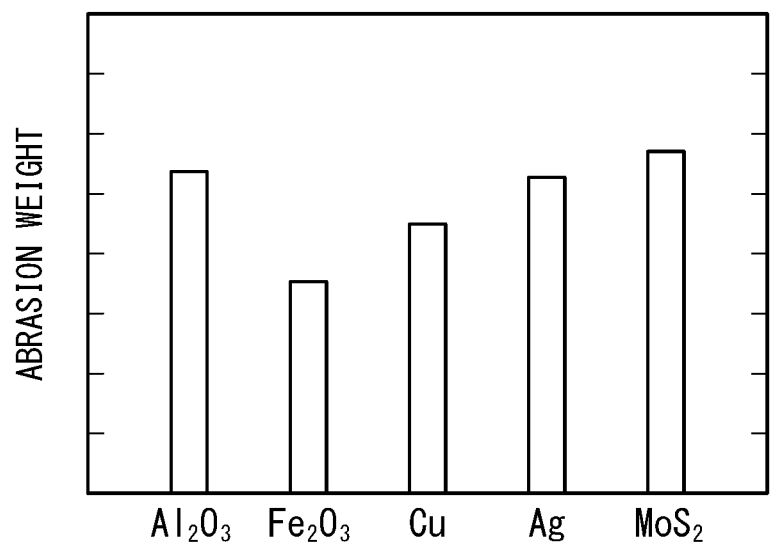
FIG. 9 is a graph for showing a result of a test conducted to verify how the amount of generation of abrasion powder differs in accordance with kinds of lubricating powder to be interposed between bearing surfaces of the foil bearing.

A new foil bearing was prepared as a test body. Solid lubricant powder was interposed in advance between an inner peripheral surface of a top foil and an outer peripheral surface of a shaft (between bearing surfaces), and the foil bearing was operated for a predetermined time period. With this, verification and investigation were conducted to find an extent of difference between the abrasion amounts of the bearing surfaces (base materials) in accordance with kinds of the solid lubricant powder to be interposed between the bearing surfaces. The result of investigation is shown in FIG. 9. In this verification test, as the top foil constructing the foil bearing and the shaft to be inserted along an inner periphery of the top foil, a top foil and a shaft made of iron-based metal material were used. Further, as the solid lubricant powder, powders of alumina, iron oxide, copper, silver, and molybdenum disulfide were prepared.

First, in all of the cases using the above-mentioned solid lubricant powders, a crucial defect such as breakage due to the slide contact with the shaft did not occur in the top foil, and the abrasion amount of the base material (total weight of the abrasion powder) was able to be suppressed to be within the range of not causing the adverse effect with respect to the bearing performance of the foil bearing.

Next, among the five kinds of the solid lubricant powders described above, when the copper powder was used, unstable behavior (for example, fluctuation in rotation torque) which occurred in some of the test bodies using the alumina powder hardly occurred. The first possible reason for this is that copper has a more excellent sliding characteristic than alumina and contributed effectively to reduction of the frictional force at the slide contact portion between the shaft and the top foil (the slide contact portion between the bearing surfaces), with the result that the rotation accuracy of the shaft was promptly stabilized. Further, the second possible reason is that the frictional force was reduced in the slide contact portion between the shaft and the top foil, and the abrasion of the base material of the top foil or the shaft was caused to be so-called mild abrasion, with the result that the particle diameter of the abrasion powder generated from the top foil or the shaft was relatively reduced. That is, there can be conceived that the generation speed of the oxide powder of the abrasion powder serving as the lubricating powder increases as the particle diameter of the abrasion powder is decreased, thereby promptly stabilizing the rotation accuracy of the shaft. Thus, as a conclusion, when the solid lubricant powder is interposed in advance between the bearing surfaces of the foil bearing, the powder of soft metal (in particular, copper powder) is effective for achieving reduced torque and longer service life of the foil bearing.

As is apparent also from FIG. 9, the abrasion amount of the base material was the smallest when the iron oxide powder was used as the solid lubricant powder. In this test, the top foil and the shaft made of iron-based metal material were used, and hence the iron oxide powder interposed in advance between the bearing surfaces as the solid lubricant powder was the powder of the same kind as the lubricating powder generated by oxidation of the abrasion powder of the base material of the top foil or the shaft. Thus, as a conclusion, the oxide of the base material of the top foil or the shaft in particular effectively contributes to reduced friction of the bearing surfaces, that is, reduced torque and longer service life of the foil bearing.

In this verification test, the solid lubricant powder was interposed between the bearing surfaces. However, there can be conceived that similar functions and effects as described above can be given, for example, when at least one of the bearing surfaces is constructed by the lubricating film having the solid lubricant powder dispersed therein.

REFERENCE SIGNS LIST 6 shaft
10 foil bearing
10A stationary side member
10B rotary side member
11 outer member
12 top foil
13 back foil
14 elastic support portion
16 lubricating powder (powder having lubricity)
17 retaining portion
20 leaf
A first bearing surface
B second bearing surface
C radial bearing gap (bearing gap)

The invention claimed is:
1. A foil bearing, comprising:
a stationary side member; and
a rotary side member,
any one of the stationary side member and the rotary side member comprising:
  a top foil formed of a flexible metal thin plate; and
  an elastic support portion configured to elastically support the top foil,
a first bearing surface arranged on the top foil,
a second bearing surface of another member opposed to the first bearing surface,
an air film formed in a bearing gap between the first bearing surface and the second bearing surface along with rotation of the rotary side member,
the rotary side member supported with a pressure of the air film, and
powder having lubricity and being interposed between the first bearing surface and the second bearing surface,
wherein at least a part of the top foil is elastically deformed in a width direction of the bearing gap in accordance with the pressure of the air film to be shifted alternately between a first state in which a retaining portion capable of retaining the powder is formed and a second state in which the retaining portion substantially disappears, and shifted from the second state to the first state along with an increase in the pressure of the air film.

2. A foil bearing according to claim 1, wherein the powder is an oxide of abrasion powder generated by abrasion of at least one of a base material of the top foil and a base material of the another member along with slide contact between the first bearing surface and the second bearing surface.

3. A foil bearing according to claim 1, wherein at least one of the first bearing surface and the second bearing surface includes a protruding portion protruding toward another bearing surface side.

4. A foil bearing according to claim 1, wherein the powder contains solid lubricant powder different from an abrasion powder of a base material of the top foil and a base material of the another member.

5. A foil bearing according to claim 1, wherein at least one of the first bearing surface and the second bearing surface is arranged on a lubricating film formed on a base material.

6. A foil bearing according to claim 1, wherein the bearing gap is a radial bearing gap.

7. A foil bearing according to claim 1, wherein the bearing gap is a thrust bearing gap.

8. A foil bearing according to claim 1, wherein the foil bearing is to be used for supporting a rotor of a turbomachine.

* * * * *